(12) United States Patent
Hofstede (10) Patent No.: US 6,399,359 B1
(45) Date of Patent: Jun. 4, 2002

(54) COMPOSITION SYSTEM

(76) Inventor: Harrie Hofstede, 20 Caddy Avenue, West Leederville. W.A. 6007 (AU)

( * ) Notice: Subject to any disclaimer, the term of this patent is extended or adjusted under 35 U.S.C. 154(b) by 0 days.

(21) Appl. No.: 09/077,530

(22) PCT Filed: Nov. 29, 1996

(86) PCT No.: PCT/AU96/00771
§ 371 (c)(1),
(2), (4) Date: May 29, 1998

(87) PCT Pub. No.: WO97/19901
PCT Pub. Date: Jun. 5, 1997

(30) Foreign Application Priority Data

Nov. 29, 1995 (AU) ............................................. PN 6869

(51) Int. Cl.⁷ ................................................. B09B 3/00
(52) U.S. Cl. ....................... 435/262.5; 71/9; 435/290.1; 435/209.4
(58) Field of Search ........................ 71/9, 12, 23, 901; 435/290.1, 290.4, 262.5

(56) References Cited

U.S. PATENT DOCUMENTS

| | | | | |
|---|---|---|---|---|
| 1,832,179 A | * | 11/1931 | Boggiano-Pico | ......... 435/290.4 |
| 3,976,186 A | * | 8/1976 | Neier | ............................. 198/8 |
| 4,062,770 A | | 12/1977 | Kneer | |
| 4,483,704 A | * | 11/1984 | Easter | ............................. 71/9 |
| 5,145,581 A | * | 9/1992 | Novy | ......................... 210/609 |
| 5,206,173 A | * | 4/1993 | Finn | ............................. 435/313 |
| 5,250,100 A | * | 10/1993 | Armbristor | ...................... 71/9 |
| 5,459,071 A | * | 10/1995 | Finn | ........................ 435/290.2 |
| 5,534,437 A | * | 7/1996 | Arrau | ...................... 435/290.3 |
| 5,591,635 A | | 1/1997 | Young et al. | |
| 5,766,935 A | * | 6/1998 | Seagren | .................... 435/290.2 |

FOREIGN PATENT DOCUMENTS

| | | | | |
|---|---|---|---|---|
| AU | 9222081 | * | 3/1993 | ............. B09B/3/00 |
| DE | 1013300 B | | 8/1957 | |
| DE | 4208486 A1 | | 9/1993 | |
| DE | 4231414 A1 | | 3/1994 | |
| DE | 29500726 U | | 4/1995 | |
| DE | 19636992 | * | 1/1998 | ........... C05F/17/00 |
| GB | 2319 245 A | | 5/1998 | |
| JP | 3237081 | * | 10/1991 | ........... C05F/17/02 |
| WO | 9207807 | * | 5/1992 | ............ A62D/3/00 |

OTHER PUBLICATIONS

Rodale, J.I., The Complete Book of Composting, pp. 35, 40–50, 211–231, 699–711, Aug. 1975.*

Qiao et al., "The effects of clay amendment on composting of digested sludge", Inst. Environ. Science, abstract, May 1997.*

Chemietechnik, "Kompostmieten Einfach Abdecken". vol. 24, Jan. 1, 1995, p. 71 XP000538818.

* cited by examiner

Primary Examiner—Wayne Langel
(74) Attorney, Agent, or Firm—Birch, Stewart, Kolasch & Birch (57) ABSTRACT

A composting system having an area for containing a mass of compostable material, and a weatherproof cover. The cover can be conformable to the mass of compostable material and protects the material from environmental factors. The cover defines a composting environment in which environmental conditions may be controlled during the composting process.

19 Claims, 4 Drawing Sheets

COMPOSITION SYSTEM

This application is the national phase under 35 U.S.C. §371 of prior PCT International Application No. PCT/AU96/00771, which has an International filing date of Nov. 29, 1996, which designated the United States of America, the entire contents of which are hereby incorporated by reference.

FIELD OF THE INVENTION

This invention relates to composting systems for treatment of organic waste in a manner accepted to be environmentally sustainable.

BACKGROUND OF THE INVENTION

Each day a large amount of solid municipal domestic waste is produced. Of all solid municipal domestic waste produced in Australia approximately 50–55% consists of food and garden waste. Other components of the waste include paper (20%), plastics (6%), glass (10%), metals (5–7%) and other inorganics (10–15%). The organic fraction has a strong detrimental impact on the environment and may be hazardous.

Detriment results from the large volume of organic waste which may occupy 50–70% of landfill space. The waste is of a putrescible nature, thus making it a potential source of pathogenic organisms. A large volume of greenhouse gases, e.g. carbon dioxide and methane are released during uncontrolled decomposition. Finally, and significantly, decomposing organic matter causes odour, attracts pests and is a major contributor to groundwater pollution through dissolution and its role as a carrier or inorganic pollutants such as heavy metals. In certain cases such pollution may make groundwater unsuitable for safe use.

Therefore, one of the main challenges in any integrated waste management strategy is the appropriate and effective treatment of organic waste. The current practice of landfilling organic waste is rapidly becoming an inappropriate waste treatment practice and will be unsustainable in the long term.

Landfilling consumes large areas of land, results in low land value and is strongly objected to by residents. Consequently, landfilling is fast disappearing in major cities as a sole waste disposal strategy. In cities with low housing densities, transport costs may become prohibitive as suitable landfill space becomes available only well away from waste generation centres.

Organic waste nevertheless has considerable potential as a resource when stabilised through composting. It is high in organic matter and contains nutrients such as nitrogen (2%), phosphorus (0.5–0.7%), potassium (0.7–1.7%) and trace elements.

Composting is the process whereby organic matter is decomposed by a range of microorganisms using oxygen. The process is appropriate for treatment of. a combination of fibrous waste (e.g. green organics) and putrescible waste such as food waste, sewage sludge and industrial and commercial organic residues. Composting has the advantage of reducing the waste volume by 30–40%. In addition, product compost has significant benefits as a soil conditioner.

A typical composting process may comprise four stages. Each stage is characterised by the activity of different generations of bacteria, fungi, protozoa and actinomycetes. During each stage the microbes use original organic compounds present in the waste as well as by-products of the metabolism of the previous generation as a nutrient and energy source. Thus the organic matter decomposes until a stable humus is formed.

The incubation or mesophilic phase lasts for approximately 24 hours during which the organic matter is rapidly invaded by mesophilic composting organisms including bacteria, actinomycetes and fungi. These organisms thrive at a temperature of 25°–45° C. The mesophilic organisms grow in this phase on the more easily assimilated substances present in the organic waste, for example: sugars, soluble protein, starch and organic acids.

The high metabolic activity of the organisms and the exothermic decomposition processes that result, in combination with the insulating properties of the composting material, causes the temperature to rise. The temperature rise strongly favours thermophilic sporogenous bacteria. The activity of these bacteria takes the process into the thermophilic phase.

During the thermophilic phase, organic matter is decomposed rapidly. Temperatures may reach 70° C. in the core of the composting material. This is undesirable, since at this temperature most process participating microbes, including some thermophilics, are killed. This may considerably reduce the decomposition rate of organic material. About 45°–50° C. is optimum and above 55° C. is typically required for pathogen destruction, thus 55° C. is accepted as an optimum temperature compromising between these factors, at which the decomposition rate is highest. These temperatures assist in accelerating the process and sanitising the material from pathogens, weed seeds and plant disease causing agents. This temperature, and below, allows the development of eumycetes and actinomycetes which are the main decomposers of long chain polymers, cellulose and lignin. The oxygen demand is very high in this phase and aeration is required. This phase may last for 2–3 weeks depending on aeration and substrate.

The cooling phase commences when there is insufficient exothermic organic substrate left to maintain the high temperature. Accordingly, water evaporation and heat convection cause temperature to drop. If the temperature drops below 45° C. mesophilic bacteria and other organisms may reinvade the fresh compost. This phase may last a few days.

A maturation or stabilisation phase is required to allow the toxicity of fresh compost to fall to enable effective utilisation by plants. The activity of fungi, protozoa and actinomycetes may be highest during this phase, while bacterial activity slowly falls. At this stage, large polymers such as lignin and cellulose are decomposed and a humidification process sets in. The activity of actinomycetes produces the compound "geosmine" which gives matured compost a fresh earthy smell. Three to four weeks may be sufficient to enable completion of this phase.

SUMMARY OF THE INVENTION

It is an objective of the present invention to provide a composting system that may enable the respective phases of the composting process to be completed in an efficient manner, under conditions that enable the most advantageous conditions for aerobic microbial decomposition of an organic substrate to occur.

With this objective in view, the present invention provides a composting system comprising an area for holding compostable material; a mass of compostable material located in the area; the area and a weatherproof cover or structure for the area defining an environment in which composting occurs, and an environmental condition which is controlled to optimise the composting process.

In particular, the weatherproof cover is preferably to be secured or appropriately sealed to prevent ingress of water or other environmental, especially climatic, impacts detrimental to efficient composting such as excessive drying out. Entry of pests and vermin is also prevented. A flexible or modular construction for the cover is preferred, particularly a cover which is readily conformable to the volume of material to be composted. The volume of the environment is dictated primarily by the volume of compostable material to be treated.

In this respect, the invention is predicated on the discovery that the composting process is dependent upon a number of variables, the control of which ensures a more efficient composting process. Further, the cover prevents escape of odour, water ingress and generation of leachate. Leachate generation is a particular problem in open air composting systems such as windrow composting and static pile forced aeration composting which are strongly dependent on weather conditions. Where rainfall is high, water may drain through compost windrows, leaching nutrients and soluble organic matter from the compost. The generated leachate may usually require treatment before discharge to surface or ground water and compost quality is reduced.

For a first example, the control of aeration may be important to conducting the composting process. Aeration provides the oxygen necessary to sustain the aerobic organisms that promote composting. In a static pile, oxygen levels can drop to below 1% by volume and carbon dioxide levels can reach 20% by volume. Such levels may be inhibitive to composting.

Therefore, aeration means to aerate the mass of compostable material are to be included within the composting system. The aeration means may provide a variable controllable proportion of recycled process air and fresh air assisting in maintenance of the compostable mass moisture at desired levels importantly preventing drying out of compost, and may provide oxygen levels within the mass of 10–18% by volume.

Control over the level of carbon dioxide in the mass of compostable material may also be desirable. In this respect, air flow may be controlled such that carbon dioxide levels are maintained below 10% by volume.

In this respect, the $O_2$ and $CO_2$ levels are interlinked and add up to ±21%. Thus if oxygen is 15%, carbon dioxide is 6%.

Accordingly, the composting system may advantageously include means for maintaining an appropriate moisture level. In this respect, recirculation of spent process air or oxygen through the mass of compostable material may be conducted to cause a flow of moist air which maintains moisture in the mass at desired levels and a carbon dioxide level of approximately 15% by volume. Recirculation of air or aeration by other means may also assist in achievement of a homogeneous moisture level throughout the mass avoiding stratification or formation of dry spots which adversely affect composting. Fresh air may then be introduced by blower or other air compressing means to maintain a ratio of recycled air to fresh air, sufficient to maintain the desired oxygen carbon dioxide level. Alternatively, fresh air or oxygen may be introduced at any time to maintain a desired recycle air to fresh air ratio and/or carbon dioxide concentration.

This ratio may be maintained at the desired level in dependence upon monitored oxygen or carbon dioxide level but may also be controlled as a function of other composting process variables, such as the temperature of the core of the mass of compostable material. Suitable sensors may be provided for these purposes and the composting system may be under the control of a microprocessor or like device.

Where warm, moist air contained within the cover is mixed with fresh air and recirculated through a blower or like means, the temperature and moisture level of the air entering the core of the compost windrow increases preventing drying out and/or premature cooling.

The weatherproof cover may be sealed at its edge by a low cost sealing means such as sandbags, soil, a water jacket, beams rods or other means. It is important that the sealing be achieved in a manner that enables effective control over the microenvironment within the weatherproof cover. Space may be at a premium. In this respect, the system is ideally designed to exclude climatic influences over the composting process, chiefly drying influences and excess rainfall which may base excess moisture and leachate generation or prolonged hot and dry conditions which may dry the compost to a point where microbiological activity ceases. The system is also advantageously flexible to suit variation in the mass of material to be treated and sealing means may be selected with this in view.

A clear manifestation of climatic influence is rainfall. Rainfall may markedly interfere with a composting process because the level of moisture in the mass of compostable material is an important process parameter. While the composting microbes may require a minimum moisture content of about 40% to avoid reduced activity, levels of moisture above about 60% may lead to the occurrence of anaerobic conditions which change the process from a composting process to a fermentation (or rotting) process. This will occur when the pores in the substrate fill with water to an extent that effective aeration is impaired. Further, excess water may be a cause of leachate generation, undesirable for environmental reasons, for example, base metal pollution and uncontrolled nutrient loss to the environment. Hence, the weatherproof cover is ideally to be a material that prevents ingress of water to the composting system due to rainfall and which prevents excess moisture loss due to drying, especially of the edges, during hot weather. Ideally, the material should facilitate collection of moist spent air and dry fresh air.

In addition, temperature may be important. Composting involves a thermophilic stage and drop in ambient temperature may effect this. Thus the material may be of a kind that prevents ingress of ambient air to the mass of compostable material and escape of odour. If necessary, provision for addition of make up fresh air may be made to minimise the effects of ambient temperature.

Typically, the system through controlled aeration and exclusion of water enables compost to be held at a sufficient temperature, defined by some standards as 55° C. or higher, for a sufficient period, a few, typically three, days to kill pathogenic organisms present in the material or biosolids.

Pathogens, both plant and human, are inherent to most types of organic wastes. In order to minimise risks to public health and flora, i.e. crops, such materials must typically be processed such that substantially complete pathogen destruction is achieved.

The provision of air circulation through the compostable material may assist in avoiding a situation where low temperature zones are formed at the base of a pile or a periphery of a windrow where excessive heat loss to the atmosphere and lack of insulation may prohibit temperatures reaching thermophilic levels. Drying out may also occur at this periphery in open windows.

Product compost which may typically have less than ten (10) total coliforms per gram compost in comparison with ARMCANZ guidelines (see Agriculture and Resource Management Council of Australia and New Zealand Water Technology Committee, Guidelines for Sewage Systems—Biosolids Management Occasional Paper WTC No 1/95 October, 1995) which specify that Class A compost may contain a maximum pathogen concentration of 100 thermotolerant coliforms per gram compost.

Typically, the compostable material may be turned once during the process (duration usually approximately 8 weeks) although turning may be conducted more frequently. However, frequent turning is undesirable as labour and equipment costs may be increased and it is not an aspect of a preferred embodiment of the present invention.

In a further aspect, the present invention provides a composting method comprising delivering a mass of compostable material to an area for holding compostable material.

The area having a weather proof cover or structure for the area defining an environment in which composting occurs, an environmental condition of which is controlled to promote the composting process.

The composting system and method of the present invention may provide a number of advantages. Firstly, the system allows control over odour, the "balloon" formed by the preferably flexible weather proof cover around the mass of the compostable material including biosolids preventing odour emission. Recycled air may be deodorised by the compost mass acting as a biofilter and excess air which requires venting may be led through a biofilter for substantially complete odour removal. Leachates are not generated in any significant amounts and may be contained and not released to the surrounding environment, at least in an untreated state. In addition, the "balloon" creates a homogeneous microenvironment which is controllable to the benefit of efficient composting. The control achieved over moisture level and pathogens may allow, for example, a more rapid composting rate. In addition, the system offers a benefit of low cost with the various components available in most locations at low cost. Low cost also offers the advantage of plant mobility with low capital risk when the system is moved from place to place.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention may be more fully understood from the following description of a non-limiting embodiment thereof made with reference to the accompanying drawings in which.

DETAILED DESCRIPTION OF THE PREFERRED EMBODIMENTS

Figure 1:
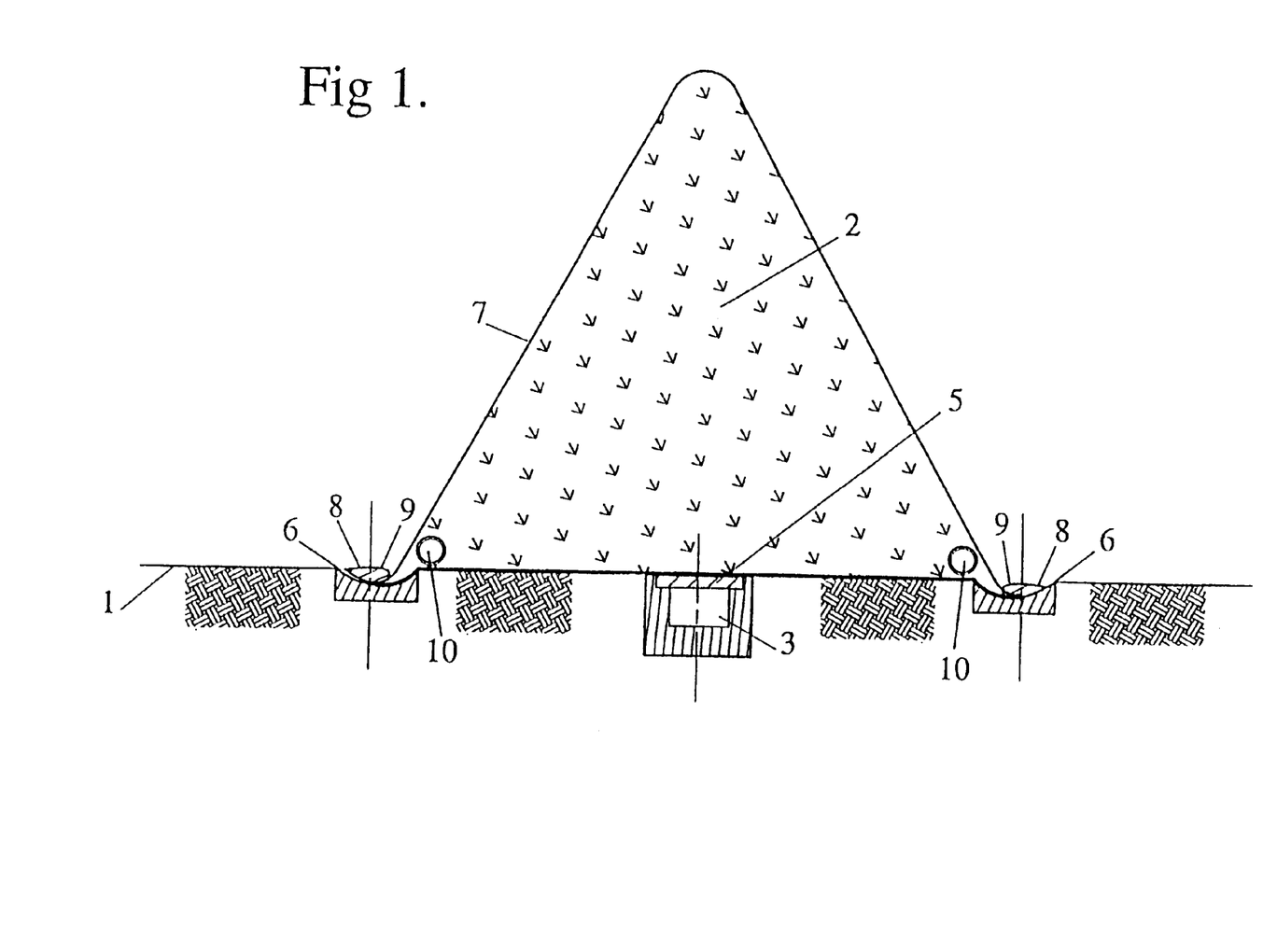
FIG. 1 is a transverse section through a composting system in accordance with one embodiment of the invention.

Referring now to FIG. 1, there is shown a transverse section of the composting system which comprises an area or base 1 on which is piled a mass of compostable material 2. The compostable material comprises organic waste, for example from domestic sources, biosolids, though other sources of waste, such as abattoirs, may be available. It may be necessary to separate the organic waste or green waste from a mixed solid waste containing paper, glass, metals, plastics and other refuse by appropriate steps, for example a system of mechanical sorters, air classifiers, magnetic conveyor belts and the like. The material may require particle size reduction by means of shredding or other forms of comminution, for example in mills (usually hammer mills) to obtain optimum particle size from the point of view of porosity structure and specific surface area.

Heavy metal analysis for acceptability may also be conducted prior to treatment commencement. If desired, an adsorbent for heavy metals, such as bauxite processing residue, may be added in accordance with the method of applicant's Australian Patent No. 661703, the contents of which are hereby incorporated by reference. Non-organic waste may account for 10–20% of the total mass of waste. Any putrescible waste may be delivered to area 1, if desired, as an amendment to the organic green waste. Moisture content of the compostable material 2 may be controlled to prevent drainage of excess liquid from the material. Any excess process water may condense against the inside of cover 7 and drain sideways for collection by discharge trench 3 or like means. This effectively distilled water may be collected in a ground collection tank or similar means preferably to be used to humidify any influent air to the process.

The area 1 comprises a solid base, made for example, from concrete, brick, compacted limestone or other possibly impermeable material which provides an all weather working surface for the mass of compostable material 2 and ideally appropriate insulation to the climatic environment. However, as leachate is not generated in significant quantities it is not essential that the base be water impermeable. The base may be modular and portable and may also advantageously insulate the mass 2 from surrounding ground advantageously avoiding of low temperature regions at the bottom of the mass. Such low temperature regions do not compost as desired and pathogen levels may remain high. Indeed, temperature is relatively homogeneous allowing composting and entry to thermophilic phase by a substantial portion of the mass of compostable material, resulting in general pathogen destruction. The base, together with the cover 7 define the composting environment, the environment has a volume sufficient to enable efficient composting of the mass of compostable material and, typically, the cover 7 will be in close proximity to the mass of compostable material. It is not desirable that the non-composting volume be at all significant as this may detrimentally affect composting process control.

At the bottom of the mass 2 is an air inlet or aeration trench 3 which forms one portion of the means to aerate the mass 2. Air is circulated through the trench 3 by means of a blower 4, shown in plan view in FIG. 2. The trench 3 is of approximately rectangular section though the ditch is not required to be restricted to rectangular geometry. The geometry could readily be semi-circular, ovoid or any other convenient geometry. Similarly, the trench 3 might be replaced with another kind of aeration means, located anywhere beneath the surface of the mass, for example the aeration means could take the form of a ditch or perforated tubing. A number of ditches, tubes or trenches could be employed, above or below ground surface level.

At the top of the ditch 3 is a grid 5, optionally made from a metallic mesh. The mesh is ideally constructed of a corrosion resistant material, such as stainless steel, to resist the corrosive influence of moist air from the mass 2.

The grid 5 serves two purposes. Firstly, the grid 5 prevents subsidence of compostable material into the ditch 3 which would reduce the effectiveness of aeration by blocking the air supply to the compostable material. Further, the apertures of the grid 5 tend to distribute the flow of air so as to better aerate the compostable material. Trench 3 or alternative means of similar function may also serve as a collection device for condensed water allowing recovery, preferably for use in humidifying influent air to the process.

At the edge of the area 1 is a gutter 6 that defines the perimeter of the area for holding compostable material. As well as receiving rainwater and allowing diversion of water away from the composting system, the gutter 6 provides a convenient location for sealing of the weatherproof cover 7 that surrounds the mass of compostable material 2. Rainfall may run off cover 7 and may be directed to flow into the gutter 6 which may be permitted to run into a usual stormwater discharge system.

As observed from FIG. 1, the mass of compostable material 2 forms a longitudinal approximately triangular pile to which the cover 7, being of a flexible low cost material, is conformed to create a microenvironment within the cover 7 in which composting can take place.

The cover 7 is conveniently of a low cost weatherproof material, such as high density polyethylene (HDPE) or PVC, woven or in the form of a film, though other polymers may also be suitable, that is waterproof and durable to prevent entry by vermin and insects, ingress of water due to rainfall which may cause a leachate flow to ground 11 surrounding area 1. The cover 7 also excludes undesirable materials and chemicals such as weed seeds and pesticides from contaminating the compost. It is also advantageously robust to other climatic influences such as windy and dry conditions which may cause drying out of the mass and a fall in composting rate to unacceptably low levels. Ideally, the cover 7 may be of air tight material to prevent ingress of air and prevent escape of odour and moisture caused by formation of volatile organic compounds and ammonia during the composting process. The cover 7 may be made of area sufficient to adapt to varying mass and volume of compostable material and appropriate folding in the region of edge 8 to achieve the desired area may be undertaken for this purpose. Flexibility or modular construction to allow for varying volumes of compostable material may enhance this advantage. The cover 7 itself could be provided with sealing means, for example, water pockets, as described below.

The edge 8 of the cover is sealed against ingress of water and escape of odour by a water jacket 9 above the edge 8 of the cover preferably forming an air-tight seal for the latter purpose. The volume of water imposes sufficient force to maintain a seal, though other means for achieving a seal may of course be adopted. For example, sufficiently heavy objects such as beams, rods, sandbags or soil may be laid in the gutter 6 to achieve the same end. Alternatively, sealing may be achieved by straps extending over the cover 7 and surface area to enable securement and sealing. Simple sealing means facilitate the conformance of the composting environment to varying volumes of compostable material contributing to system flexibility.

Figure 4:
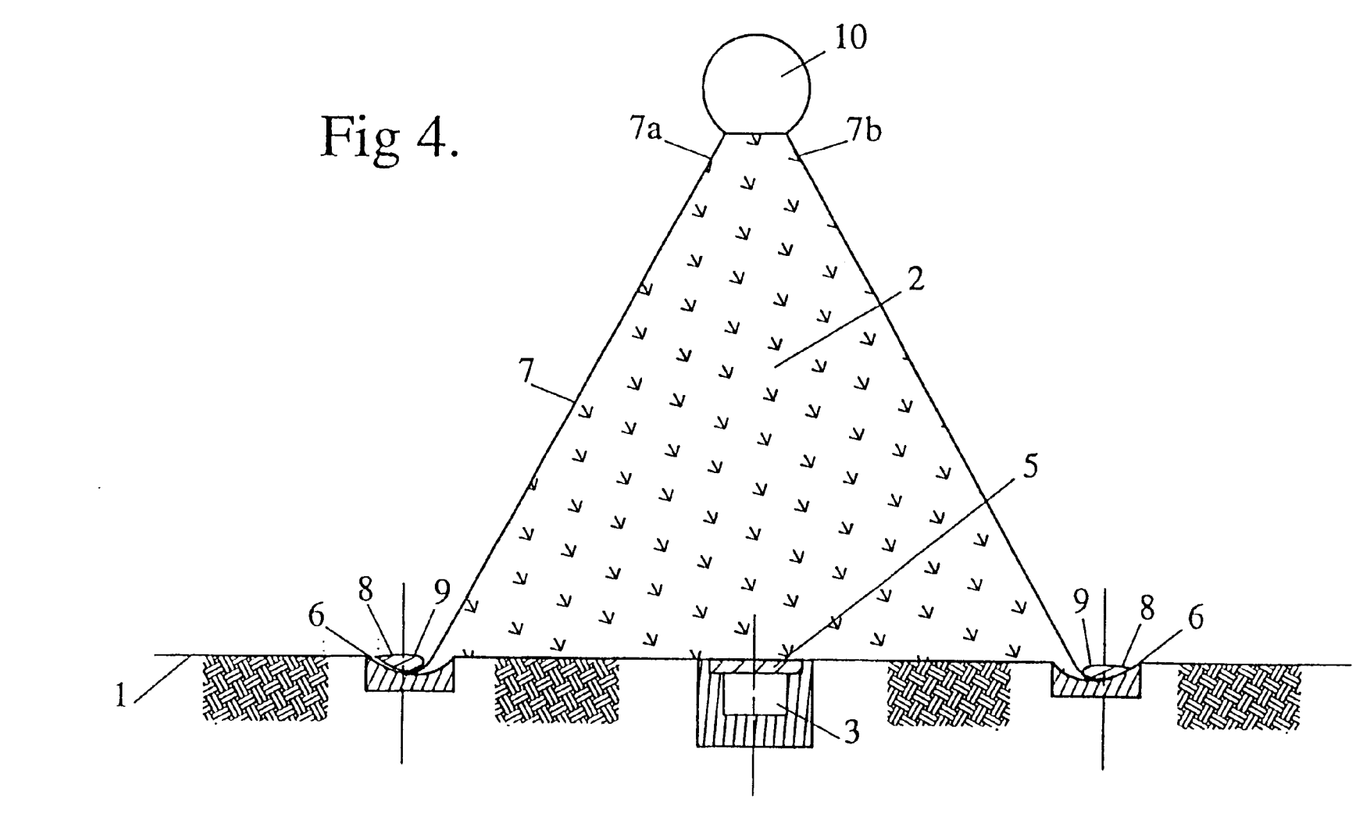
FIG. 4 shows a transverse section of a second preferred embodiment of the composting system of the present invention.

The aeration means is completed by the air recycle pipe 10 which takes spent process air away from the mass of compostable material 2 under the influence of blower 4 by suction. The pipe 10 may be simply perforated or agricultural tubing which collects process air and recycles it to the blower 4 which, in a preferred embodiment as shown in FIG. 1, has a substantial portion thereof provided along the bottom edge(s), one being shown in plan view in FIG. 2, of the mass of compostable material, and which takes circulated air away from the mass of compostable material 2 under the influence of blower 4. Alternatively, as shown in FIG. 4, a substantial portion of the recycle pipe 10 may be provided at the top of the system, the flexible pipe being fixed by a portion of the cover 7 bridging section 7a and 7b thereof by suitable fastening means.

Figure 2:
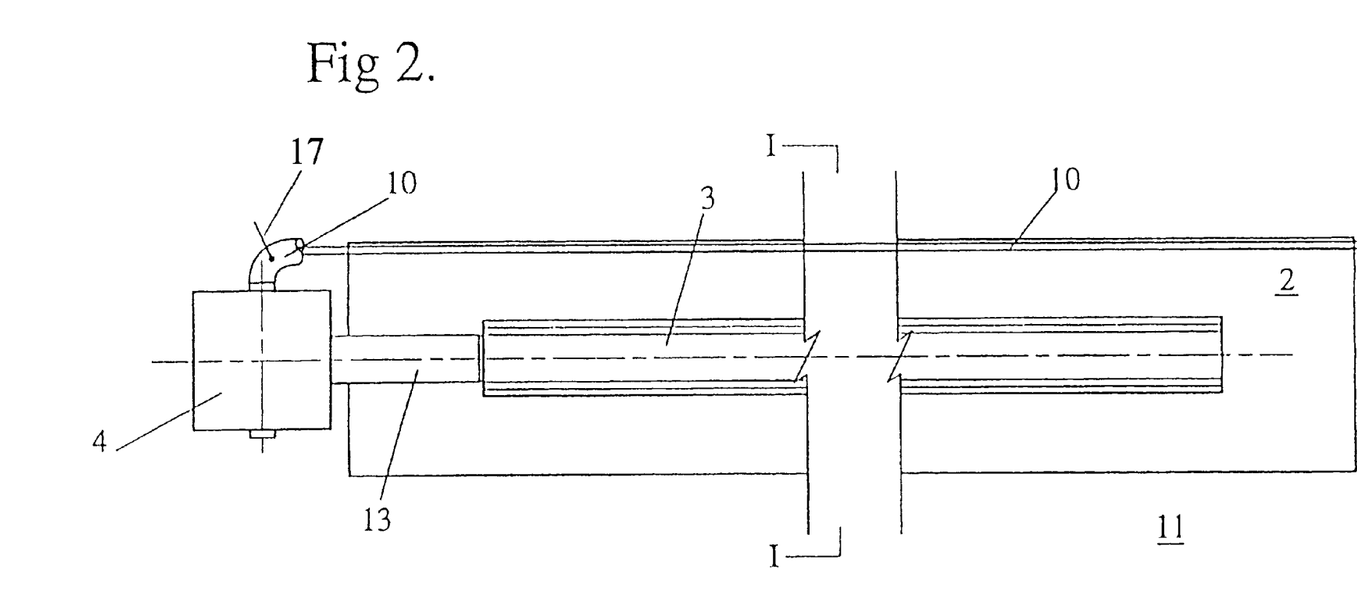
FIG. 2 is a plan view of the composting system in accordance with the embodiment of FIG. 1.

Turning now to the plan view of the composting system shown in FIG. 2 it may be seen that air inlet trench 3 extends longitudinally along the base of the mass of compostable material 2 preferably substantially the whole length thereof.

The air passing through the air recycle pipe 10 is returned to the blower 4 and, upstream thereof may be located a moisture, oxygen or carbon dioxide concentration sensor 11 which monitors the concentration of one or other of the gases. In accordance with the monitored gas concentration, a valve or other means, as understood in the art of blowers, may be set either manually or automatically to proportion fresh air, by means of blower 4, into the air inlet ditch 3 to achieve the desired levels of moisture, oxygen and carbon dioxide through, control via the blower and proportioning means, an appropriate ratio of recycled air to fresh air. If a valve is used, the valve may be of solenoid or other suitable type as may be understood by those involved in engineering of pneumatic systems. The recycle/fresh air mixture passes through pipe 13 to air inlet ditch 3. pipe 13 may be of any convenient plastic material, e.g. PVC. Fresh air addition assists in maintaining preferred composting conditions. Any air discharged to maintain the balance of fresh to recycled air may be treated, for example, by a suitable biofilter to remove odour forming compounds.

The rate of aeration of the mass of compostable material of the mass of compostable material 2 may also be controlled in accordance with the temperature sensed by temperature sensors located at desired locations within the system. The most advantageous locations for temperature sensors are at the air inlet, the core and in the surface regions of the mass of compostable material 2. Temperature. at these locations generally reflects the efficiency of the composting process.

Spent process air recycling may serve an important role in reducing odour as the odour causing compounds may typically be adsorbed by the compostable material which may act as a biofilter after recycling.

The system may include a covered raw material storage area for material awaiting pretreatment and conditioning prior to being placed in the system and air from this area may be extracted from this area by blower 4 for use in aeration of the windrow or otherwise treated for odour removal. Thus the potentially odorous air from the raw material storage area may be vented to the system accordingly, further assisting in odour emission control.

The system may be conveniently placed under manual or automatic control, for example, of an electronic control unit.

A computer control system is desirable for this purpose. In accordance with measured variables, such as temperature, $O_2$ concentration, $CO_2$ concentration, moisture level, the blower 4 may be operated at a desired recycle air: fresh air ratio to maintain composting conditions at an optimal level from the point of view of microbiological activity, and composting may proceed with little intervention from personnel.

Composting should continue for sufficient duration to diminish the levels of phytotoxic compounds caused by intermediate metabolites and high ammonia levels in immature compost. Ideally composting should proceed at least three weeks and preferably eight weeks per tonne of waste.

The contained nature of the system allows stable composting under controlled conditions. The final product is more acceptable from the standpoint of both environmental and commercial considerations and may be implemented at relatively low cost with reduced processing time.

The present invention may be particularly advantageous where medium to large quantities of waste need to be processed in environments where odour emissions and leachates are of concern. Therefore, residential areas, such as cities, may be areas of typical application.

There will now be described the performance of a development system operated in accordance with the system and method of the present invention as described above with particular reference to the preferred embodiment. In this example, the effectiveness of the system in processing a mixture of green waste and biosolids, in particular sewage sludge (anaerobically digested primary sludge, not typically treated in composting), was evaluated.

Process Heat Distribution

Figure 3:
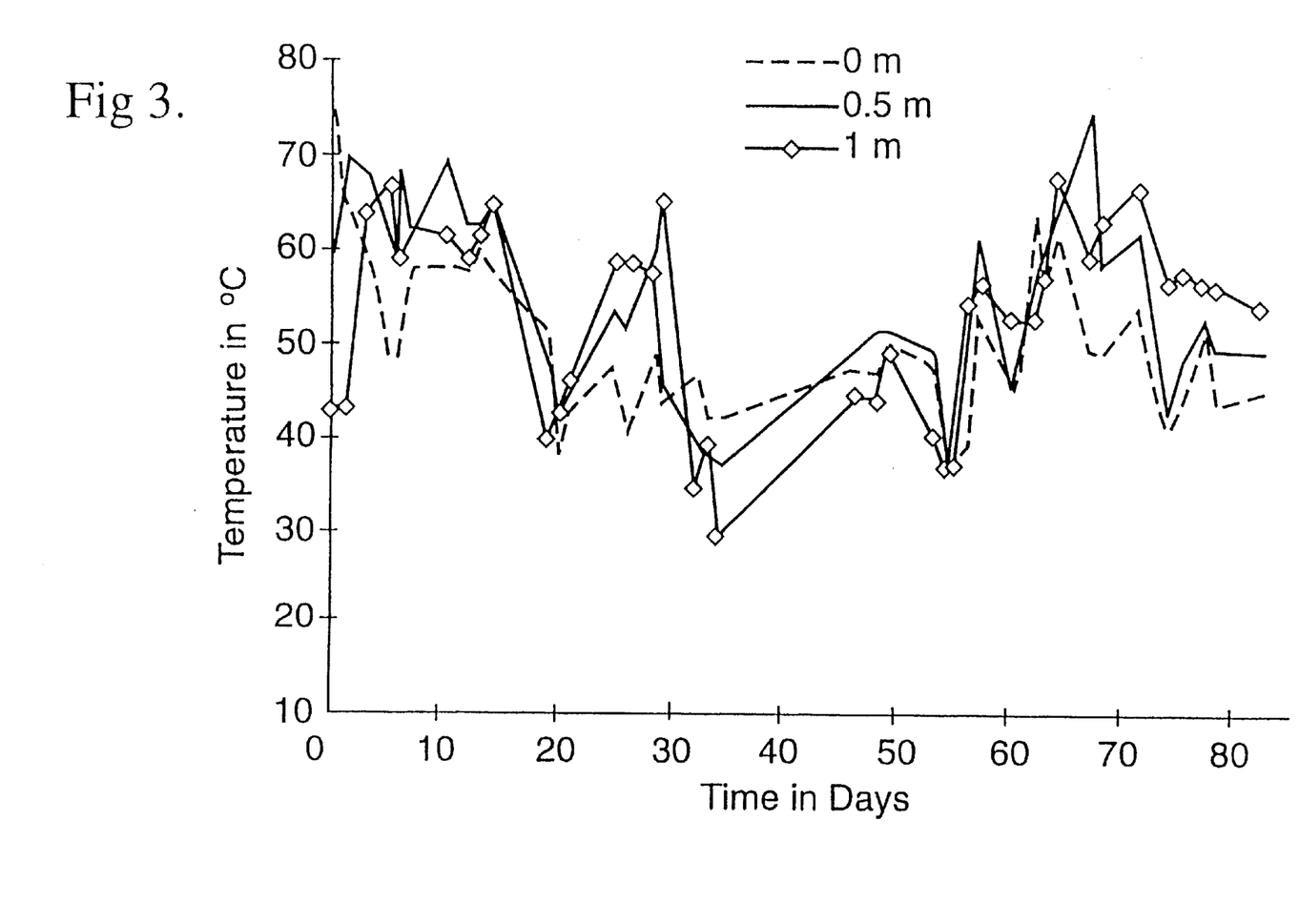
FIG. 3 is a temperature profile of a region of the system constructed in one embodiment of the present invention.

The ARMCANZ guidelines (see Agriculture and Resource Management Council of Australia and New Zealand Water Technology Committee, Guidelines for Sewage Systems—Biosolids Management Occasional Paper WTC No 1/95 October, 1995) require composting to be carried out at thermophilic temperatures (>55°C.) for at least three continuous days to produce grade 1A compost. The ARMCANZ grade 1A composting requirements were met throughout the windrow using the method and system of the invention, including at the windrow surface. Reference is made to a FIG. 3 which shows a temperature profile at the windrow surface and various depths within the pile. It has been found in previous practice that in open windrow composting systems the surface temperatures are too low (near ambient, at 15–30° C.) to meet these guidelines. It is thought, without wishing to be bound by any theory, that the preferably flexible cover of the system insulates the windrow from climatic conditions thereby preventing heat loss. Materials for the cover may be selected with this in view. Such a cover may also trap solar radiation which may assist in heating the windrow surface. It has been found that windrow surface temperatures may reach up to 70° C. during composting and this a special advantage of the present system. An air layer containing trapped air will typically be present and acids in insulation of the compost mass.

The thermophilic stage may be extended by including "thermophilic" amendments such as sawdust or wastewater skimmings to the compost. Without wishing to be bound by any theory, skimmings, chaff or materials providing more energy per mole of carbon than sawdust may be preferred as an amendment though sawdust may be used. The lipid content of skimmings is a factor in providing a higher energy output.

It will be noted that in forced aeration composting systems known to the prior art, the windrow core is often subjected to excessive evaporative cooling such that the above guidelines may not be met. In the present system, this problem may be alleviated by regulating aeration with a computer controlled system to satisfy the composting aeration requirements without excessive cooling. Further, recycling of moist and warm windrow exhaust air back into the system may further reduce evaporative cooling.

Pathogen Levels

It was found that pathogen levels in compost made by biosolids/green waste using the present system complied with the above guidelines for compost of the highest standard, grade 1A compost. MPN <2 is only limited by the detection limit of the methodology. Therefore product compost from the system was found to be suitable for unrestricted distribution. In an open windrow system, pathogen reinfestation of sanitised material from inside the windrow may occur at or after turning by mixing of the sanitised material with the pathogen infested surface material or and/or bringing the sanitised material from inside the windrow to the surface thus exposing the material to vectors like insects and vermin.

TABLE 1

Pathogen Levels in the Final Biosolids Compost (82 days old) Compared to Grade 1A Biosolids.

| Pathogen | Grade 1A (MPN) | Grade 1B (MPN) | Pathogens in ADPS compost (MPN) Sample location | | | |
|---|---|---|---|---|---|---|
| | | | 1 | 2 | 3 | 4 |
| Salmonella (per 50 g) | <1 | <10 | <2 | <2 | <2 | <2 |
| Thermotolerant coliforms (per g) | <100 | <1000 | 43 | 23 | 9 | <3 |

NB 1 = surface;
2 = surface;
3 = 1 m below surface;
4 = 15 cm below surface

It may be seen from Table 1 the product compost complies with ARMCANZ guidelines for grade 1A compost.

Leachate Generation

The system of the invention is designed to prevent generation of leachate during processing or composting. This is one of the benefits of the system. The ground directly beneath the windrow was tested for leachate. Ammonia nitrogen (found in higher concentrations in the windrow material) was used as a tracer to indicate leaching. The (compost) concentration of ammonia nitrogen in 1/5 (w/v) water extracts of the windrow material was 28 ppm compared to the soil ambient level of between 1 and 2 ppm. The ammonia nitrogen levels of the soil 15 cm below the ground surface under the windrow were at ambient levels, i.e. at 1 to 2 ppm. Therefore it was found in the experiment that the transfer of ammonia nitrogen (hence leachate) from the windrow material into the ground did not occur and this lack of leachate percolation was advantageous.

Odour

This was assessed qualitatively and only a slight smell could be detected by persons located at the composting site, the smell being described as a "sweet" compost smell. None described the odour as unpleasant, as with pure untreated biosolids. The flexible plastic cover may provide a seal against emission odours which would otherwise have been much higher and this may be advantage of the system.

General Compost Quality

This is most important to the marketability of compost especially as a soil amendment. Product complied with Standards Australia Draft Standard DR 95301. Quality parameters of produced compost in the experiment are shown in Table 2.

TABLE 2

General Composting Parameters of the Biosolids/Green Waste Mixture.

| Parameter | Initial Material | Final Product (8 weeks) |
|---|---|---|
| Total organic carbon, % | 31.1 | 28.7 |
| Total organic nitrogen, % | 1.67 | 1.95 |
| Carbon to nitrogen ratio | 18.6 | 14.7 |
| Total phosphorus | 0.61 | 0.72 |
| Buffer capacity, % $CaCO_3$ | 16.7 | 21.1 |
| Ash, % | 40.1 | 50.7 |
| Salinity (Elec conductivity in mS) | 2.37 | 2.46 |
| pH | 7.6 | 6.7 |

Typically composting increases quality of material by concentrating nitrogen and phosphorus. The C/N ratio typically suitable for land application after composting. Composting typically increases ash content as it is expected to remove the readily putrescible organic matter which may encourage pathogen regrowth. It was found that the electrical conductivity (salinity) and pH of compost were ideal for land application.

It will be understood that modifications to the above described composting system may be made without departing from the scope of the present invention.

In particular, the system need not be controlled identically with the description above. Furthermore, the system may comprise an area with other than approximately rectangular geometry.

The air could be treated for odour removal, for example by treatment with an adsorbent prior to recirculation if adsorbent capacity of the compostable material is insufficient.

Further, a full scale plant might comprise a number of, preferably parallel covered windows with air recirculation possibly being under the control of an integrated control system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The claims defining the invention are as follows:

1. A method of operating an open air composting system including (a) an area having a base for holding and treating compostable material; (b) in use, a mass of compostable material located in the area; (c) a weatherproof cover having an outer surface which conforms during composting, to the mass of compostable material and being secured to said base of said area for defining with said base a composting environment; (d) means for securing the cover to the base for forming said composting environment; (e) aerating means including a gas inlet means for flowing moist oxygen containing gas to said composting environment and gas outlet means for collecting moist spent process gas from said composting environment, a portion of said moist spent process gas being recycled to the composting environment in combination with a portion of fresh oxygen containing gas; and (f) a control unit for controlling an operation of the aerating means during composting wherein a ratio of said portion of moist spent process gas recycled to said composting environment to said portion of fresh oxygen containing gas is controlled in accordance with a measured variable of said portion of said spent process gas recycled to said composting environment to control oxygen concentration and moisture content of said mass of compostable material, said method comprising delivering the mass of compostable material to the area for holding compostable material, the area and the weatherproof cover or structure for said area defining an environment in which composting occurs, an environment condition of which is controlled to promote the composting process.

2. The method of claim 1 wherein said control unit controls a moisture content in the process air.

3. The method of claim 1 wherein the environment is substantially filled with compostable material leaving an insulating layer of air between the material and the cover.

4. The method of claim 1 wherein the system includes a covered raw material storage area vented for supplying air for aeration of said mass of compostable material.

5. The method of claim 1 wherein spent process air is recovered by a recycle pipe, a substantial portion of said recycle pipe being located above said compostable material at the top of said cover.

6. The method of claim 1 wherein spent process air is recovered by a recycle pipe, a substantial portion of said recycle pipe being provided along bottom edges of said mass of compostable material.

7. The method of claim 1 wherein an absorbent is added as an amendment to said mass of compostable material.

8. The method of claim 1, wherein either of a bauxite process residue or an absorbent is added as an amendment to sail mass of compostable material.

9. An open air method for composting a mass of compostable material comprising:
   (a) forming a mass of compostable material in an area having a base for holding said material;
   (b) conforming a weatherproof cover to said mass of compostable material for defining with said base an enclosed composting environment on securement to the base;
   (c) securing the cover to said base to form said composting environment;
   (d) flowing a moist oxygen containing gas through said mass of compostable material during composting by an aerating means including a blower and gas inlet means for flowing said moist oxygen containing gas to said enclosed composting environment and gas outlet means for collecting moist spent process gas from said composting environment;
   (e) recycling a portion of said moist spent process gas to said composting environment in combination with a portion of fresh oxygen containing gas; and
   (f) controlling flow of the moist oxygen containing gas through the mass of compostable material during composting with a control unit wherein a ratio of said portion of moist spent process gas recycled to said composting environment to said portion of fresh oxygen containing gas is controlled in accordance with a measured variable of said portion of said spent process gas recycled to said composting enviroment to control oxygen concentration and moisture content of said mass of compostable material.

10. The method of claim 9 wherein an aerating means provides a flow of process air through said environment.

11. The method of claim 10 wherein fresh air is added to the flow of process air delivered by the aerating means.

12. The method of claim 9 wherein air is discharged through the environment following treatment for odor removal.

13. The method of claim 9 wherein process water generated within the environment is employed in control of moisture levels in air delivered by an aerating means.

14. The method of claim 9 wherein spent process air is recovered by a recycle pipe and returned to a blower.

15. The method of claim 9 comprising the further step of separating organic waste from a mixed solid waste prior to forming said mass of compostable material.

16. The method of claim 9, wherein the step of securing said removable cover to said base includes the step of forming a substantially air-tight seal between the removable cover and the base.

17. The method of claim 9, wherein the step of conforming a removable cover to said mass of compostable material includes the step of substantially conforming a shape of the removable cover with an exterior of the mass of compostable material.

18. An open air method for composting a mass of compostable material comprising:

(a) forming a mass of compostable material in an area having a base for holding the mass of compostable material;

(b) conforming a weatherproof cover to the mass of compostable material for defining with the base a sealed composting environment with an outer surface of the weatherproof cover is secured to the base;

(c) securing the cover to the base to form the sealed composting environment;

(d) flowing a moist oxygen containing gas through a portion of an aerating means located in the base and through said mass of compostable material during composting, said aerating means also including a blower and gas inlet means for flowing said moist oxygen containing gas to said enclosed composting environment and gas outlet means for collecting moist spent process gas from said composting environment;

(e) recycling a portion of said moist spent process gas to said composting in combination with a fresh oxygen containing gas; and (f) controlling flow of said moist containing gas through the mass of compostable material during composting with a control unit wherein a ratio of said portion of moist spent process gas recycled to said composting environment to said portion of fresh oxygen containing gas is controlled in accordance with a measured variable of said portion of said spent process gas recycled to said composting environment to control oxygen concentration and moisture content of said mass of compostable material.

19. An open air method for composting a mass of compostable material comprising:

(a) forming a mass of compostable material in an area having a base for holding said material;

(b) conforming a weatherproof cover to said mass of compostable material for defining with said base an enclosed composting environment on securement to the base;

(c) securing the cover to said base to form said composting environment;

(d) flowing a moist oxygen containing gas through said mass of compostable material during composting by an aerating means including a blower and gas inlet means for flowing said moist oxygen containing gas to said enclosed composting environment and gas outlet means for collecting moist spent process gas from said composting environment;

(e) recycling a portion of said moist spent process gas to said composting environment in combination with a portion of fresh oxygen containing gas; and (f) controlling flow of said moist oxygen containing gas through the mass of compostable material during composting with a control unit wherein a ratio of said portion of moist spent process gas recycled to said composting environment to said portion of fresh oxygen containing gas is controlled in accordance with a measured variable of said composting environment to control oxygen concentration and moisture content of said mass of compostable material.

\* \* \* \* \*